United States Patent
Shambaugh et al.

(10) Patent No.: US 6,870,926 B2
(45) Date of Patent: Mar. 22, 2005

(54) METHOD OF OPTIMIZING CALL CENTER RESOURCES BASED UPON STATISTICS

(75) Inventors: Craig R. Shambaugh, Wheaton, IL (US); Joe Bloom, Libertyville, IL (US); Anthony J. Dezonno, Bloomingdale, IL (US); David Funck, Wheaton, IL (US); Jeff Hodson, Wheaton, IL (US); Eric James, Elgin, IL (US); Michael Peters, Downers Grove, IL (US); Mark J. Power, Carl Stream, IL (US); Dave Mosquera, West Chicago, IL (US); Nayel Saleh, Round Lake, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 525 days.

(21) Appl. No.: 09/992,367

(22) Filed: Nov. 6, 2001

(65) Prior Publication Data

US 2003/0086557 A1 May 8, 2003

(51) Int. Cl.⁷ .............................................. H04M 3/00
(52) U.S. Cl. ............................ 379/265.05; 379/265.02; 379/266.1
(58) Field of Search ...................... 379/265.02, 265.03, 379/265.05, 265.06, 265.07, 265.08, 265.09, 265.1, 265.12, 265.13, 265.14, 266.07, 266.1, 127.01

(56) References Cited

U.S. PATENT DOCUMENTS

| | | | | |
|---|---|---|---|---|
| 5,903,641 A | * | 5/1999 | Tonisson | 379/265.12 |
| 6,278,777 B1 | * | 8/2001 | Morley et al. | 379/265.02 |
| 6,661,882 B1 | * | 12/2003 | Muir et al. | 379/127.01 |
| 6,744,879 B1 | * | 6/2004 | Dezonno | 379/265.05 |

* cited by examiner

Primary Examiner—Bing Q. Bui
(74) Attorney, Agent, or Firm—Welsh & Katz, Ltd.

(57) ABSTRACT

A method and apparatus are provided for allocating resources within a call center based upon a predetermined business rule of an enterprise controlling the call center. The method includes the steps of analyzing records from a plurality of call transactions based upon the predetermined business rule, recognizing a correlation among the call transaction records based upon the predetermined business rule and adjusting a resource of the call transactions based upon the recognized correlation and predetermined business rule.

29 Claims, 3 Drawing Sheets

METHOD OF OPTIMIZING CALL CENTER RESOURCES BASED UPON STATISTICS

FIELD OF THE INVENTION

The field of the invention relates to communication systems and more particularly to call centers.

BACKGROUND OF THE INVENTION

Call-centers are generally known. A call-center is typically used wherever a large number of calls must be handled for some common enterprise. Typically, the calls of the enterprise are routed through the call-center as a means of processing the calls under a common format.

Call-centers typically include at least three elements: an automatic call distributor (ACD), a group of agents for handling the calls, and a host computer containing customer information. The individual agents of the groups of agents are each typically provided with a telephone console and a computer terminal. The telephone terminal receives customer calls distributed to the agent by the ACD. The terminal may be used to retrieve customer records from the host.

Call-centers are typically automated in the delivery of calls to agents and in the retrieval of customer records for use by agents. Features within the PSTN such as dialed number identification service (DNIS) and automatic number identification (ANI) may be used to determine not only the destination of the call, but also the identity of the caller. DNIS and ANI information, in fact, may be delivered by the PSTN to the ACD in advance of call delivery.

Based upon the destination of the call and identity of the caller, the ACD may select the agent most qualified to service the call. By sending an identifier of the selected agent along with the identity of the caller to the host, the host may retrieve and download customer records to the agent's terminal at the same instant as the call arrives.

While call-centers are effective, they are still complex and difficult to adapt to changing business environments. Accordingly, a need exists for a way of automatically adapting the call center to business conditions.

SUMMARY OF THE INVENTION

A method and apparatus are provided for allocating resources within a call center based upon a predetermined business rule of an enterprise controlling the call center. The method includes the steps of analyzing records from a plurality of call transactions based upon the predetermined business rule, recognizing a correlation among the call transaction records based upon the predetermined business rule and adjusting a resource of the call transactions based upon the recognized correlation and predetermined business rule.

DETAILED DESCRIPTION OF AN ILLUSTRATED EMBODIMENT

Figure 1:
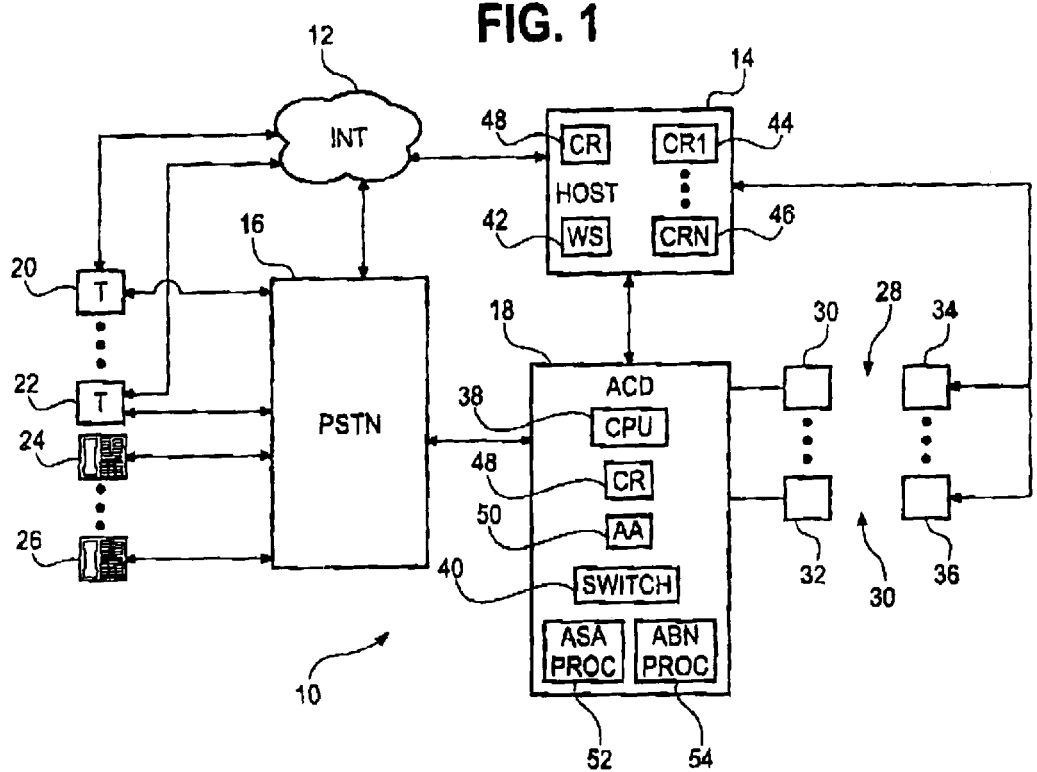
FIG. 1 is a block diagram of a call processing system in accordance with an illustrated embodiment of the invention.

FIG. 1 is a block diagram of a call processing system 10 shown generally in a context of use and in accordance with an illustrated embodiment of the invention. Under the illustrated embodiment, calls may be received from, or placed to, customers 20, 22, 24, 26 under any of a number of different formats.

Voice calls may be processed through the PSTN 16 using a conventional audio channel and plain old telephone service (POTS) telephones 24, 26. Alternatively voice calls may be routed between a terminal 20, 22 of a customer and the call center through the Internet 12 under a voice-over-IP (VoIP) format. Alternatively, a call may simply be a customer 20, 22 accessing a web site 42 of the call processing center 10 through the Internet 12.

Turning first to FIG. 1, a description will be provided of the mechanisms of customer interaction with the call processing system 10. Following a description of the interaction, an explanation will be provided of how those interactions may be used to automatically reallocate resources of the call center.

The call processing center 10 may include an ACD 18, a host 14 and a number of agents, each working though an agent station 28, 30. Each agent station 28, 30 may include a conventional telephone console 30, 32 and a computer terminal 34, 36.

The host 14 may include a web site 42 and a data base of customer records 44, 46. As the agents converse with customers 20, 22, 24, 26, the agents (or supervisory personnel) may access and modify a customer's records (e.g., 44) through an associated terminal 34, 36.

In the case of voice calls, a caller (e.g., a customer using a convention telephone) 24, 26 may place a call to the call processing system 10. The PSTN 16 may route the call to the ACD 18 of the call processing system 10 along with certain types of call associated information. Call associated information may include DNIS information including a telephone number dialed by the caller and ANI information including the caller's identity. DNIS and ANI are both services provided by the PSTN 16.

Outbound calls may be initiated by the call processing system 10. A list of contacts (and contact information) may be maintained within the host 14. The host 14 may transfer telephone numbers to the ACD 18 at a rate intended to partially or fully occupy a staff of agents 28, 30. Call associated information, in this case, may simply be the contact information maintained within contact files located within the host 14.

Upon arrival at the ACD 18, the call may be detected at a port of a matrix switch 40. In the case of inbound calls, call associated information may be delivered by the PSTN 16 to a CPU 38 of the ACD 18. As a preliminary step, the CPU 38 may create a call record 48 for purposes of tracking the call. The call record may include any call associated information delivered along with the call.

The CPU 38 may send the call record 48 to the host 14 as a shared file. The host 14 functioning as a connection analyzer may access the customer's records 44, 46 using the identifier of the customer from the call associated information and retrieve caller preferences (favorite agent, frequently purchased products, most recently purchased product, etc.). The host 14 may append a list of the customer preferences to the call record 48 and send the record 48 back to the CPU 38 of the ACD 18.

Based upon the contents of the call file 48, the CPU 38 may select an agent to handle the call. Upon selection of an agent, the CPU 38 may notify the host 14 of the identity of the agent selected. In response, the host 14 may transmit the customer records to the selected agent. The customer records from the host 14 may appear as a screen pop on the terminal 34, 36 of the agent at the instant the call arrives.

Alternatively, if an agent is not available, the call may placed in a call queue or be routed by the CPU 38 to an auto-attendant (AA) 50. The AA 50 may provide the caller with a series of menu options under an audible format. The caller may choose options by providing simple voice responses (e.g., YES, NO, etc.) or by activating touch-tone keys on his telephone. The AA 50 may decode any simple responses using voice or tone recognition to decode any responses. The decoded responses may be added to the call record 48 as additional call associated information that may be used to further improve routing efficiency of the call.

As an alternative to a telephone call delivered through the PSTN 16, a caller 20, 22 may access the web site 42 through the Internet 12. To access the web site 42, the customer 20, 22 may enter a universal resource locator (URL) of the web site 42 into his browser and transmit an access request packet to the web site 42.

Within the host 14, the packet arriving from the customer 20, 22 may be decoded both to deliver the packet to the web site 42 and also to recover the source URL of the sender 20, 22. The host 14 again functioning as a connection analyzer may access the customer record files 44, 46 and identify the caller 20, 22 using the caller's URL. Upon identifying the caller, 20, 22, the host 14 may retrieve the customer's preferences and a most recent buying records.

The host 14 may also create a call record 48 to track the call. The call file or record 48 may include the URL or some other identifier of the caller, information retrieved from the customer's records 44, 46, an identifier of the web site 42 and any web page visited. Information entered by the caller into any interactive windows on a web page may also be stored within the call file.

As with voice calls, information collected and entered into the call record 48, without the participation of an agent, becomes call associated information. In general, and as used herein, call associated information means a URL of the caller, ANI or DNIS information or any other information given by the customer through the call connection without participation of an agent either orally or manually using a keypad, mouse, softkeys or keyboard.

Figure 2:
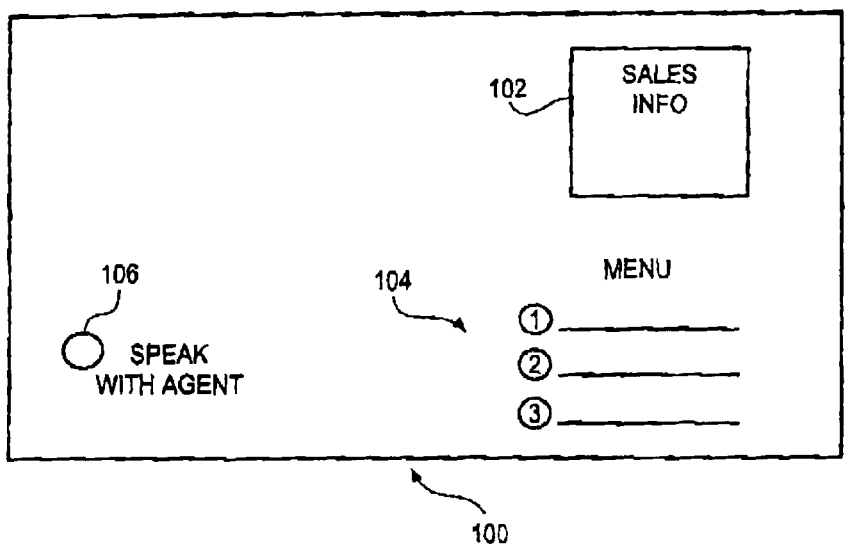
FIG. 2 is a web page that may be used by the system of FIG. 1.

Upon decoding of the packet, the web site 42 may return a web page 100 (FIG. 2) to the caller 20, 22. Included within the web page 100 may be sales information 102, menu selections 104 to obtain further information and also a softkey 106 for voice access to an agent 28, 30 in the event the caller wishes to place an order or to ask a question.

If the caller 20, 22 should activate the softkey 106 requesting access to an agent, then the host 14 may send an agent request (including the call file 48) to the CPU 38 of the ACD 18. The agent request may include a subject matter of the web page 100 as well as customer preferences.

Upon receiving the agent request, the CPU 38 of the ACD 18 may first determine which agents are available and then which of the available agents is best suited to answer the call. The CPU 38 may determine which agents are available to receive a call by identifying agents whose telephone is on-hook.

In addition, the CPU 38 may access an agent training list to determine which, if any, agent is qualified to answer a question regarding the web page from which the request originated. Once an agent is identified, the CPU 38 transfers an identifier of the selected agent to the host 14. The CPU 38 may also mark the selected agent as occupied to avoid assigning any further calls to the selected agent until the current call is complete.

Upon receiving the identifier of the selected agent, the host 14 may transfer the URL of the caller 20, 22 to the selected agent along with instructions to activate a VoIP application within the agent's terminal 34, 36. The host 14 may also transfer any customer records 44, 46 to the terminal of the selected agent for display during the call.

Upon receipt of the URL of the caller 20, 22, a VoIP call connection may be established between the agent 28, 30 and the caller 20, 22. The agent 28, 30 may then converse with the caller 20, 22 while at the same time reviewing and making changes to any customer records 44, 46 downloaded to the agent terminal 34, 36.

In order to select an agent appropriate to the call, the CPU 38 of the ACD 18 may classify the call under any of a number of different criteria. For example, where the call processing system 10 is conducting an outgoing call campaign, then the CPU 38 may classify any completed calls based upon the subject matter of the call campaign. If incoming calls through the PSTN 16 are directed to specific telephone numbers (e.g., sales, service, etc.), the CPU 38 may classify the calls according to the destination. If the call originates through access to the website 42, the CPU 38 may classify the call according to the web page from which the call request originated or any web page visited. Further, the calls may be classified using the above considerations and/or any other information present within the call record 48 created upon detection of the call.

In order to service a number of different call types, the agents 28, 30 of FIG. 1 may also be classified according to skills in servicing particular call types. Once classified according to skill, the agents 28, 30 may be assigned to call groups created to service particular types of calls.

Figure 3:
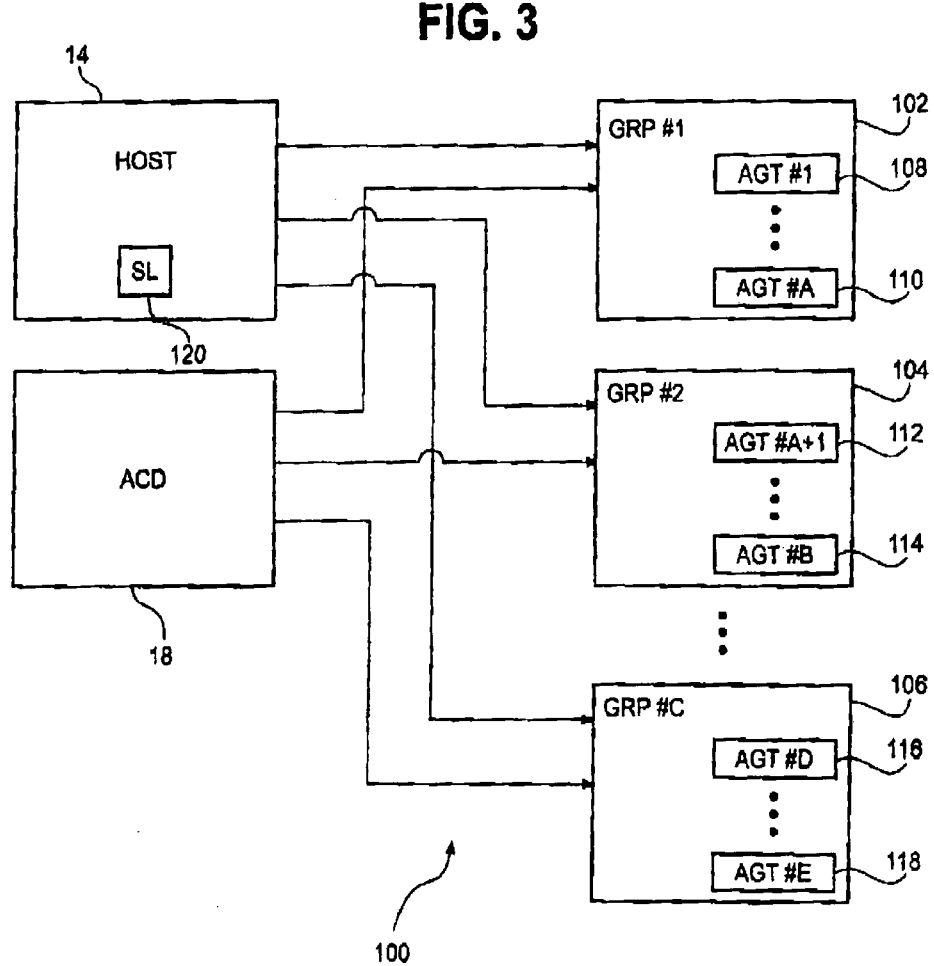
FIG. 3 is a call flow diagram that may be used by the system of FIG. 1.

FIG. 3 depicts a call routing diagram 100 that may be used by the call processing system 10 of FIG. 1. As shown in FIG. 3, the call processing system 10 may have a number of call groups 102, 104, 106 available for servicing specific call types. Each group 102, 104, 106 may have a number of agents assigned to the group (e.g., the first group 102 may have agents 108, 110; the second group 104 may have agents 112, 114; the third group may have agents 116, 118, etc.). (Each agent 108, 110, 112, 114, 116, 118 of FIG. 3 may correspond to an agent station 28, 30 shown in FIG. 1.)

As calls are directed to specific groups 102, 104, 106 based upon call type, the calls may be assigned to specific agents 108, 110, 112, 114, 116, 118 based upon any appropriate criteria (e.g., availablility, specific knowledge of the customer, skill, customer preference, etc.). Upon completion of call set-up, the agent 108, 110, 112, 114, 116, 118 may converse with the customer 20, 22, 24, 26.

If the enterprise (not shown) controlling the call processing system 10 is a merchant, the objective of the contacts between customers 20, 22, 24, 26 and agents 108, 110, 112, 114, 116, 118 may be product sales. If the enterprise controlling the call processing system 10 is a political or environmental organization, then the objective of the contacts may result simply in a greater awareness of the organization and its goals.

The enterprise controlling the call processing system 10 may impose any of a number of rules under which the call processing system 10 may allocate resources towards a particular objective in processing call transactions. As used herein, a resource of a call transactions is anything contributing to or supplying information content passing through a call connection between a customer and the call center.

If the user is a merchant and the objective is gross profit, then the rules may require that the profit of each product provide the predominant criteria for allocating resources. Alternatively, the rules may require that profit be the predominant criteria for some particular product, but not for others. For example, where a product is in great demand and in ample supply, the rule may dictate that sales volume be the only criteria for allocating resources to that product. Where a product has great profit, but is hard to sell and has a high rate of returns, then the rules may require that sales and customer service for that product both have higher priority in claiming resources of the call processing system 10 than other less profitable products.

Similarly, if the user is a political organization, then the rules may require that some objectives (e.g., saving the environment) may have a greater claim on resources than other objectives (e.g., balancing the national budget). In general, the call processing system 10 may be assumed to operate in a resource-limited environment (i.e., lower priority objectives may provide resources for higher priority objectives).

In general, and depending upon the level of abstraction, any enterprise controlling a call processing center 10 may be regarded as a business. As such, the rules under which the enterprise operates will be referred to as business rules.

A transaction processor 191 within the host 14 (FIG. 4) may function to process call transactions based upon the objectives of the business rules. A set of criteria may be provided under each objective of the business rule as a basis for reallocating resources. Further, objectives and even business rules may be given different priorities.

In general, the criteria may be applied based upon call type. As transactions are processed, the transactions may be correlated by call type. Once the transactions are correlated by call type, the criteria for that call type may be applied.

Where the criteria for achieving an objective of a call type is not met, then other call types operating under the same business rule and criteria may be examined. Where the criteria has been met, resources may be transferred from those call types where the criteria has been met to the call types where the criteria has not be met.

Alternatively, where a criteria of a call type operating under a particular business rule is not met and there are no other call types where the criteria has been met under that business rule, then the call types operating under other business rules may be examined. If the business rule where the criteria that has been met has a lower priority than the business rule where the criteria has not been met, then resources may be transferred from the lower priority call type to the higher priority call type.

The information for determining whether the handling of a call type conforms to a business rule may be provided by any of a number of different methods and from any of a number of different sources. For example, where the business rule is directed to customer service then any of a number of directly related call processing parameters (e.g., average speed of answer (ASA), abandonment rate (ABN), etc.) may be used as a criteria for measuring conformance with that business rule. ASA and ABN may be determined within the ACD 18 by the CPU 38 or by a separate ASA processor 52 and/or a separate ABN processor 54.

Figure 4:
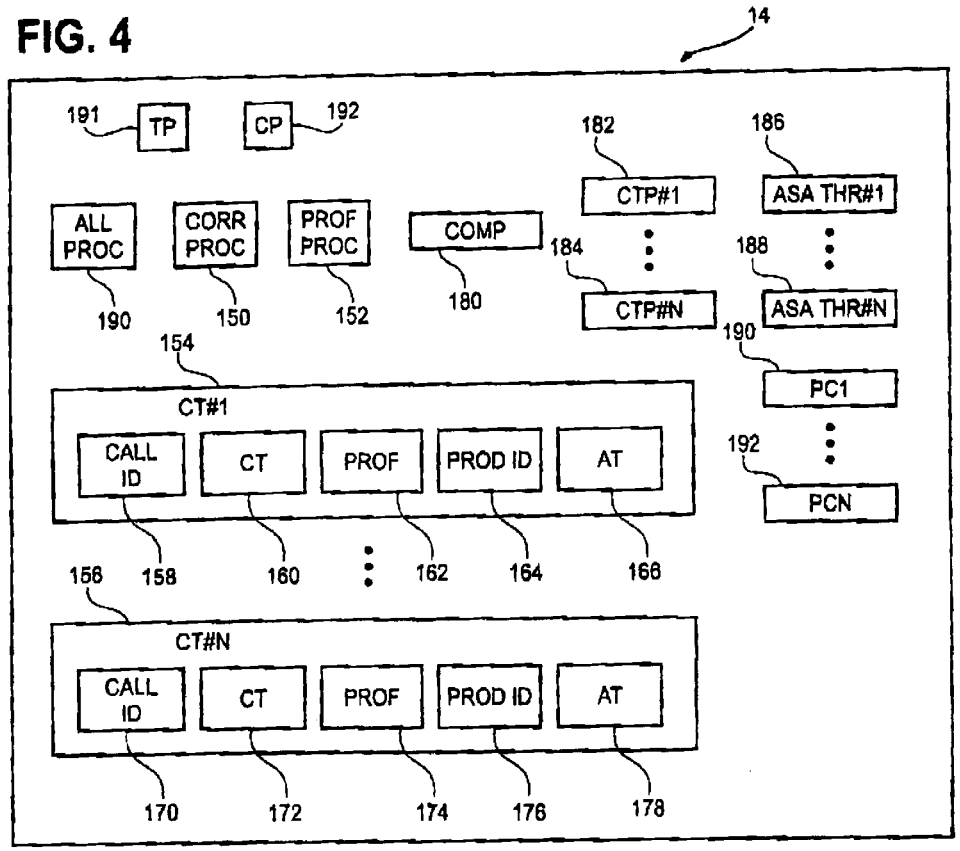
FIG. 4 depicts features of the host shown in FIG. 1.

Alternatively, where the results of calls may be measured, then the call results may be used as a criteria for reallocating resources. For example, since the host 14 maintains customer records 44, 46, the host 14 may retrieve each customer record 44, 46 after each transaction, analyze its contents and create a summary of each call transaction 154, 156 (FIG. 4). As used herein, records from call transactions means call handling and call routing information and also enterprise data directly related to the call transaction under the predetermined business rules.

Each summary 154, 156 may include a call identifier 158, 170 and a call type 160, 172. Where the enterprise is a merchant, the summary may include a profit index 162, 174 for any new sale as well as a product identifier 164, 176. The summary 154, 156 may also include any associated products 166, 178 sold during the transaction.

A profit processor 152 may determine a profit index 162, 175 of each sale. The profit index 162, 175 may be based upon an absolute profit or any of a number of other factors (e.g., overstock, the need to maintain marketshare, product perishability, etc.).

A correlation processor 150 may correlate summaries 154, 156 based upon call type. Where the business rule is based exclusively upon the profit index, then a comparator 180 may order the call types based upon the relative average value of the profit index of each call type.

Based upon the ordered list of call types by profit index, an allocation processor 190 within the host 14 could allocate resources on a proportionate basis. However, if very few or no calls were being received by the call type providing the greatest profit, the result would be the inefficient use of resources.

As an alternative to proportionately allocating resources based upon a business rule objective, a criteria processor 190 may use an indirect criteria for reallocating resources. The criteria used may be based upon a set of ASA threshold values 186, 188. The criteria may be provided for only the call types with a highest profit index or may be scaled in such a manner as to apply to all call types. For example, the ASA threshold may be set very high for call types with a very low profit index and relatively low (e.g. 2 seconds) for call types with a relatively high profit index. Alternatively, the ASA thresholds may be scaled proportionate to the profit index.

As calls are received, an allocation processor 190 may periodically retrieve measured ASA values from ASA processor 52 within the ACD 18. The retrieved values may be compared with the threshold values 186, 188. Where the retrieved ASAs for call types with relatively high profit indexes exceed the threshold values 186, 188, then resources (e.g., agents) may be transferred from call groups 102, 104, 106 with a low profit index to the call groups 102, 104, 106 with a relatively high profit index.

To accomplish the reallocation of resources, the allocation processor 190 may identify the first call type of the ordered list (i.e., the call type with the highest relative profit index). If the ASA for the call type exceeds the threshold 186, 188, then the allocation processor 190 may begin to look for resources in support of the first call type.

For example, if group #1 102 (FIG. 3) services the first call type and groups #2-C 104, 106 service other call types, then the allocation processor 190 may look to the other groups #2-C 104, 106 to find agents to transfer to group #1. The allocation processor 190 may do this by searching for a second group (e.g., group #2 104) with excess agents (i.e., the ASA for the second group is less than the threshold). If the processor 190 cannot find a group with excess agents, then the processor 190 may look for any group of a lower priority (i.e., a lower profit index).

Upon identifying a group 104, the processor 190 may next, by reference to a skills list 120, determine if any agents in the identified group 104 are qualified to handle calls of the first call type. If so, the processor 190 may select the most qualified agent and send instructions to the ACD 18 to move the agent from the second group 104 to the first group 102.

Upon completion of reallocation of resources for the first call type, the processor 190 may move to the second call type and repeat the process. The process may be repeated until each call type in the ordered list has been considered.

It should be noted in conjunction with the above example, that the host 14 may dynamically determine the profit index 162, 174. For example, the host 14 may be provided with a set of raw product costs 190, 192 for each product. As the raw product costs 190, 192, change, the host 14 may detect and calculate relative changes in the profit indexes 164, 176. As the relative profit indexes 164, 176 change, the host 14 may adjust thresholds and reallocate resources accordingly.

It should also be noted, that the correlation processor 192 may also recognize and correlate associated transactions 166, 178 with products Ids 164, 176. For example, a call may be classified as a first call type based upon call associated information. The first call type may be associated with the sale of a particular product "A" identified by a product ID (e.g., 164). By processing a number of records of the call type, the correlation processor 192 may recognize that the sale of product A often occurs in conjunction with an associated product "B" (e.g., 166).

Upon recognition and correlation of associated transaction, the host 14 may allocate resources in support of the associated sale. To support sales of the associated product, the host 14 may insert information into a script read by an agent 28, 30 informing the customer 20, 22, 24, 26 of the tendency of other customers to purchase the associated product.

Figure 5:
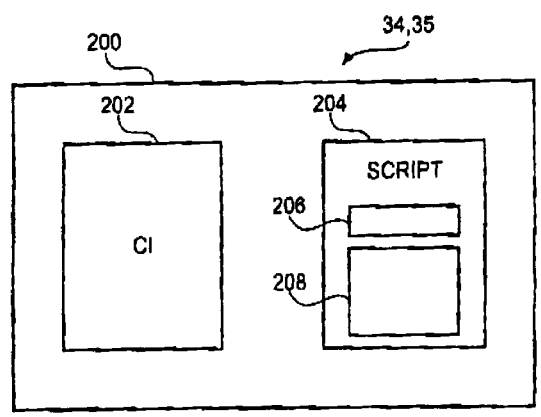
FIG. 5 depicts a presentation screen that may appear on a terminal of an agent of the system of FIG. 1.

For example, FIG. 5 depicts a screen 200 that may be presented to an agent 28, 30 during a conversation with a customer 20, 22, 24, 26. Included within the screen 200 may be customer records 202. Also included within the screen 200 may be a script 204 that may be read to the customer 20, 22, 24, 26 during a sales presentation.

Where the correlation processor 192 recognizes an associated product frequently sold during a transaction, the host 14 may insert additional scripting 206 directed to the associated product. The additional script 206 may simply contain a sentence offering to sell the associated product (e.g., "Other customers who buy product A also tend to prefer product B. Would you care to hear more about product B?").

A specific embodiment of a method and apparatus for allocating resource within a call center been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of allocating resources within a call center based upon a predetermined business rule of an enterprise controlling the call center, such method comprising the steps of:
   analyzing records from a plurality of call transactions based upon the predetermined business rule;
   recognizing a correlation among the call transaction records based upon the predetermined business rule;
   adjusting a resource of the call transactions based upon the recognized correlation and predetermined business rule; and
   prioritizing call types based upon the predetermined business rule, wherein the step of prioritizing call types comprises identifying a first call type with a highest relative priority and a lowest relative average speed of answer and a second call type with a lowest relative priority and a highest relative average speed of answer.

2. The method of allocating resources within a call center as in claim 1 wherein the step of analyzing records further comprises determining a profit margin for each call transaction of the plurality of call transactions.

3. The method of allocating resources within a call center as in claim 2 wherein the step of recognizing a correlation further comprises associating the determined profit with a call type of each of the plurality of call transactions.

4. The method of allocating resources within a call center as in claim 3 wherein the step of associating the determined profit with a call type of each of the plurality of call transactions further comprises identifying a first call type with a highest relative profit and a second call type with a lowest relative profit.

5. The method of allocating resources within a call center as in claim 4 wherein the step of adjusting a resource further comprises reassigning agents from the second call type with a lowest relative profit margin to the first call type with a highest relative profit margin.

6. The method of allocating resources within a call center as in claim 1 wherein the step of analyzing records further comprises determining an average speed of answer for each call transaction of the plurality of call transactions.

7. The method of allocating resources within a call center as in claim 6 wherein the step of recognizing a correlation further comprises associating the determined average speed of answer with a call type of each of the plurality of call transactions.

8. The method of allocating resources within a call center as in claim 7 wherein the step of associating the determined average speed of answer with a call type of each of the plurality of call transactions further comprises prioritizing call types based upon the predetermined business rule.

9. The method of allocating resources within a call center as in claim 1 wherein the step of adjusting a resource further comprises reassigning agents from the second call type to the first call type.

10. The method of allocating resources within a call center as in claim 1 wherein the step of analyzing records further comprises identifying a second product often sold in conjunction with a first product.

11. The method of allocating resources within a call center as in claim 10 wherein the step of recognizing a correlation further comprises associating the first product with a call type of each of the plurality of call transactions.

12. The method of allocating resources within a call center as in claim 11 wherein the step of adjusting a resource further comprises inserting an offer to sell the second product into a script read by an agent selling the first product.

13. An apparatus for allocating resources within a call center based upon a predetermined business rule of an enterprise controlling the call center, such apparatus comprising:
   means for analyzing records from a plurality of call transactions based upon the predetermined business rule, wherein the means for analyzing records further comprises means for identifying a second product often sold in conjunction with a first product;
   means for recognizing a correlation among the call transaction records based upon the predetermined business rule; and means for adjusting a resource of the call transactions based upon the recognized correlation and predetermined business rule.

14. The apparatus for allocating resources within a call center as in claim 13 wherein the means for analyzing records further comprises means for determining a profit margin for each call transaction of the plurality of call transactions.

15. The apparatus for allocating resources within a call center as in claim 14 wherein the means for recognizing a correlation further comprises means for associating the determined profit with a call type of each of the plurality of call transactions.

16. The apparatus for allocating resources within a call center as in claim 15 wherein the means for associating the determined profit with a call type of each of the plurality of call transactions further comprises means for identifying a first call type with a highest relative profit and a second call type with a lowest relative profit.

17. The apparatus for allocating resources within a call center as in claim 16 wherein the means for adjusting a resource further comprises means for reassigning agents from the second call type with a lowest relative profit margin to the first call type with a highest relative profit margin.

18. The apparatus for allocating resources within a call center as in claim 13 wherein the means for analyzing records further comprises means for determining an average speed of answer for each call transaction of the plurality of call transactions.

19. The apparatus for allocating resources within a call center as in claim 18 wherein the means for recognizing a correlation further comprises means for associating the determined average speed of answer with a call type of each of the plurality of call transactions.

20. The apparatus for allocating resources within a call center as in claim 19 wherein the means for associating the determined average speed of answer with a call type of each of the plurality of call transactions further comprises means for prioritizing call types based upon the predetermined business rule.

21. The apparatus for allocating resources within a call center as in claim 20 wherein the means for prioritizing call types based upon the predetermined business rule further comprising means for identifying a first call type with a highest relative priority and a longest relative average speed of answer and a second call type with a lowest relative priority and a highest relative average speed of answer.

22. The apparatus for allocating resources within a call center as in claim 21 wherein the means for adjusting a resource further comprises means for reassigning agents from the second call type to the first call type.

23. The apparatus for allocating resources within a call center as in claim 13 wherein the means for recognizing a correlation further comprises means for associating the first product with a call type of each of the plurality of call transactions.

24. The apparatus for allocating resources within a call center as in claim 23 wherein the means for adjusting a resource further comprises means for inserting an offer to sell the second product into a script read by an agent selling the first product.

25. An apparatus for allocating resources within a call center based upon a predetermined business rule of an enterprise controlling the call center, such apparatus comprising:

a transaction processor analyzing records from a plurality of call transactions based upon the predetermined business rule;

a correlation processor adapted to recognize a correlation among the call transaction records based upon the predetermined business rule; and an allocation processor adapted to adjust a resource of the call transactions based upon the recognized correlation and predetermined business rule; and an allocation processor adapted to prioritize call types based upon the predetermined business rule, wherein the means for prioritizing call types comprises means for identifying a first call type with a highest relative priority and a lowest relative average speed of answer and a second call type with a lowest relative priority and a highest relative average speed of answer.

26. The apparatus for allocating resources within a call center as in claim 25 wherein the allocation processor further comprises a profit processor adapted to determine a profit margin for each call transaction of the plurality of call transactions.

27. The apparatus for allocating resources within a call center as in claim 26 wherein the correlation processor further comprises a call transaction record adapted to associate the determined profit with a call type of each of the plurality of call transactions.

28. The apparatus for allocating resources within a call center as in claim 27 wherein the call transaction record further comprises a comparator adapted to identify a first call type with a highest relative profit and a second call type with a lowest relative profit.

29. The apparatus for allocating resources within a call center as in claim 25 wherein the transaction processor further comprises an ASA processor adapted to determine an average speed of answer for each call transaction of the plurality of call transactions.

* * * * *